(12) United States Patent
Takahashi

(10) Patent No.: US 11,290,609 B2
(45) Date of Patent: Mar. 29, 2022

(54) IMAGE PROCESSING APPARATUS AND IMAGE PROCESSING METHOD

(71) Applicant: CANON KABUSHIKI KAISHA, Tokyo (JP)

(72) Inventor: Yasuhiro Takahashi, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/122,375

(22) Filed: Dec. 15, 2020

(65) Prior Publication Data

US 2021/0195051 A1 Jun. 24, 2021

(30) Foreign Application Priority Data

Dec. 23, 2019 (JP) .............................. JP2019-231989

(51) Int. Cl.
*H04N 1/047* (2006.01)
*H04N 1/00* (2006.01)

(52) U.S. Cl.
CPC ......... *H04N 1/047* (2013.01); *H04N 1/00013* (2013.01); *H04N 1/00037* (2013.01); *H04N 1/00082* (2013.01)

(58) Field of Classification Search
CPC .............. H04N 1/047; H04N 1/00037; H04N 1/00082; H04N 1/0032; H04N 1/00411; H04N 1/00588; H04N 1/0066; H04N 1/0071; H04N 1/00718; H04N 1/00721; H04N 1/00737; H04N 1/00774; H04N 1/3878; H04N 1/40; H04N 2201/0094; H04N 1/00013; H04N 1/00018; H04N 1/00092; H04N 1/00519–00679; H04N 1/00681–00761; H04N 1/00785–00827; H04N 1/00835; H04N 1/00909; H04N 1/024–0318; H04N 1/04–207; H04N 2201/024–04798; H04N 1/00002; H04N 1/00236; H04N 1/00241; H04N 1/00689; H04N 1/00702; H04N 1/00729; H04N 1/00745; H04N 1/00782; H04N 1/00795; H04N 1/00816; H04N 2201/0081; H04N 1/00694; B65H 2511/10; B65H 2511/216;
(Continued)

(56) References Cited

U.S. PATENT DOCUMENTS 10,146,485 B1* 12/2018 Tanaka .................... G06F 3/125
10,321,001 B2* 6/2019 Mizuno ................ H04N 1/3875
(Continued)

FOREIGN PATENT DOCUMENTS

JP 2016163168 A 9/2016

*Primary Examiner* — Negussie Worku
(74) *Attorney, Agent, or Firm* — Rossi, Kimms & McDowell LLP

(57) ABSTRACT

There is provided an image processing apparatus including: a determination unit configured to determine an inclination of a document portion in read image data generated by reading a document based on an inclination of an edge of the document portion detected in the read image data; a correction unit configured to correct the inclination of the determined document portion by a rotation process of the read image data; and a cut-out unit configured to cut out, based on a size of the document portion determined from the detected edge, a partial image of the document portion from the read image data in which the inclination has been corrected.

8 Claims, 12 Drawing Sheets

(58) Field of Classification Search
CPC ........ B65H 2511/242; B65H 2511/414; B65H 2220/02; B65H 2220/03; B65H 2402/46; B65H 2801/39; B65H 3/063; B65H 3/0653; B65H 7/02; B65H 7/20; G06K 9/3275
USPC ....................................................... 358/1.15
See application file for complete search history.

(56) References Cited

U.S. PATENT DOCUMENTS

| | | | |
|---|---|---|---|
| 2008/0212132 A1* | 9/2008 | Matsumoto | H04N 1/00374 358/1.15 |
| 2010/0142012 A1* | 6/2010 | Yamamoto | H04N 1/00729 358/498 |
| 2016/0261758 A1 | 9/2016 | Kimura | |
| 2017/0195503 A1* | 7/2017 | Mishima | H04N 1/6008 |
| 2017/0339285 A1* | 11/2017 | Sadakuni | H04N 1/00875 |
| 2018/0054539 A1* | 2/2018 | Terada | H04N 1/00816 |
| 2018/0229956 A1* | 8/2018 | Yoshimura | H04N 1/00782 |
| 2019/0112139 A1* | 4/2019 | Hirayama | H04N 1/00002 |
| 2019/0354320 A1* | 11/2019 | Ito | G06F 3/1271 |
| 2020/0076976 A1* | 3/2020 | Nakamura | H04N 1/00809 |
| 2020/0252513 A1* | 8/2020 | Nakada | H04N 1/00779 |

\* cited by examiner

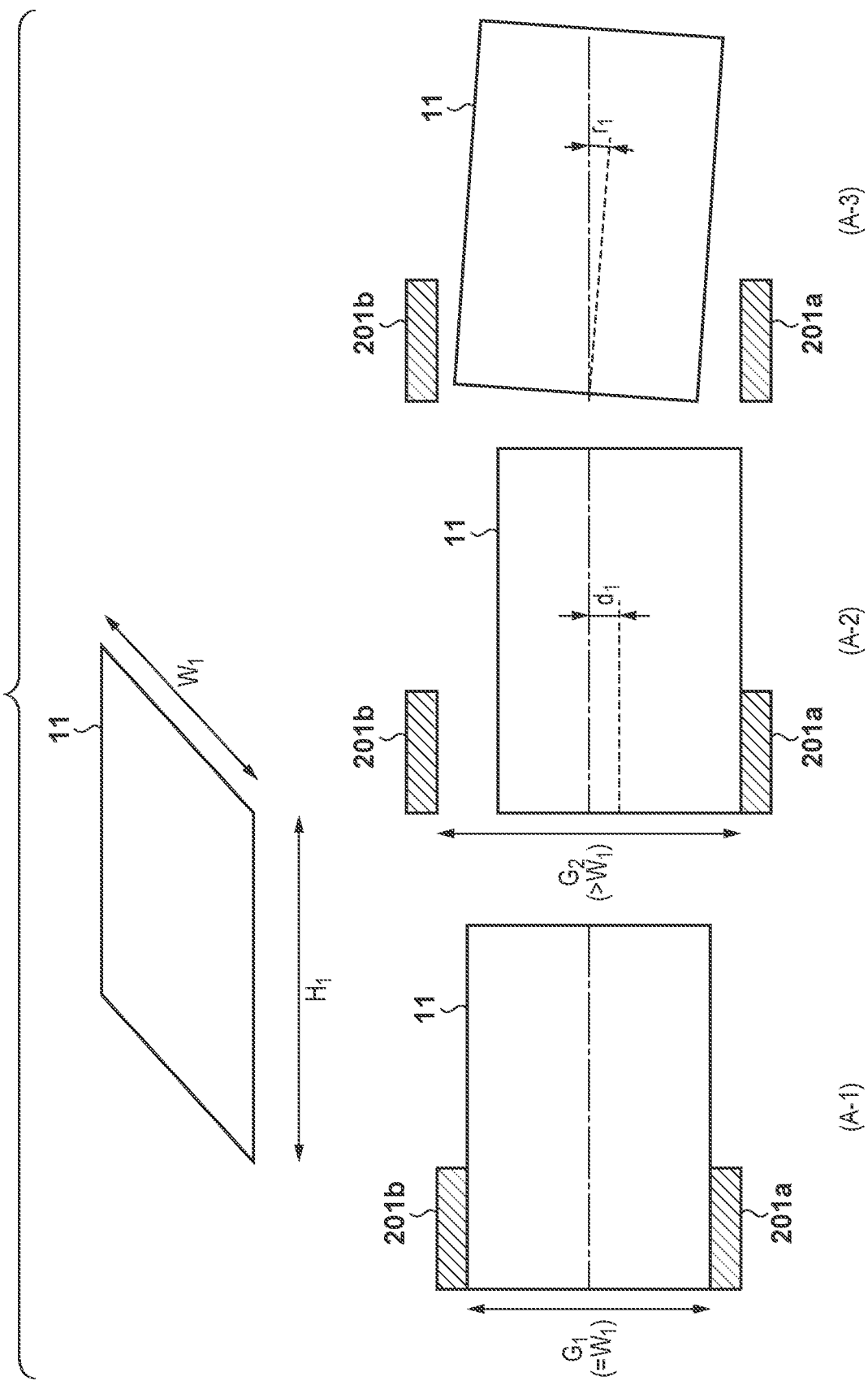

FIG. 10 1000

DETAILED SETTINGS

BIND

PAGE PRINT

NUMBER OF COPIES PRINT

1010
MIXED SIZE

IMAGE COMBINATION

1020 — CLOSE

FIG. 11 1100

MIXED SIZE SETTINGS

1110
EQUAL WIDTHS

1120
DIFFERENT WIDTHS

1030 — CLOSE

F I G. 13  1300

THERE IS NO OPTIMAL PAPER SHEET

PLEASE SUPPLY PAPER SHEET OF A4 LANDSCAPE TO CASSETTE

| CASSETTE 1 | A4 PORTRAIT PLAIN PAPER |
| CASSETTE 2 | A4 PORTRAIT PLAIN PAPER |
| CASSETTE 3 | A3 LANDSCAPE PLAIN PAPER |
| CASSETTE 4 | A3 LANDSCAPE PLAIN PAPER |

IMAGE PROCESSING APPARATUS AND IMAGE PROCESSING METHOD

BACKGROUND OF THE INVENTION

Field of the Invention

The present disclosure relates to an image processing apparatus and an image processing method.

Description of the Related Art

In a case where a document is inclined when read by a scanner, an image of a document portion is inclined in read image data. The reason why the document is inclined may be, for example, that a width between document guides is not appropriately fitted with a width of the document set in an automatic document feeder (ADF), unintended movement of the document during document conveyance, or the like.

Japanese Patent Laid-Open No. 2016-163168 discloses a technology for correcting an inclination of a document portion in read image data by rotation of an image. A reading apparatus disclosed in Japanese Patent Laid-Open No. 2016-163168 detects an inclination of a document based on deviation at the time of arrival of the document observed by a plurality of sensors arranged at equal intervals in a direction orthogonal to a conveyance direction, and rotates a read image so that the detected inclination is mitigated.

SUMMARY OF THE INVENTION

However, the quality of reading a document deteriorates not only by an inclination of the document but also by a positional displacement of the document. For example, when a width between document guides is too wide compared to a width of a document, a portion of the document may fall out of a reading range fitted to a regular document size, or a blank portion may enter the reading range. A portion that has gone out of the reading range will be missed in read image data. Reading the blank portion causes an unwanted blank space in the read image data. The reading apparatus disclosed in Japanese Patent Laid-Open No. 2016-163168 reads a document by using a regular document size, and then performs rotation processing for inclination correction, so it is not possible to sufficiently resolve the deterioration in reading quality due to the positional displacement of the document.

Therefore, it is desirable to resolve the deterioration in reading quality due to an inclination and a positional displacement of a document as much as possible.

According to an aspect, there is provided an image processing apparatus including: a determination unit configured to determine an inclination of a document portion in read image data generated by reading a document based on an inclination of an edge of the document portion detected in the read image data; a correction unit configured to correct the inclination of the determined document portion by a rotation process of the read image data; and a cut-out unit configured to cut out, based on a size of the document portion determined from the detected edge, a partial image of the document portion from the read image data in which the inclination has been corrected.

Further features of the present invention will become apparent from the following description of exemplary embodiments (with reference to the attached drawings).

BRIEF DESCRIPTION OF THE DRAWINGS

FIG. 3A is a first explanatory diagram for describing an inclination and a positional displacement of a document.

FIG. 10 is an explanatory diagram illustrating an example of a GUI for detailed settings that may be displayed on the screen of the multi-function peripheral.

FIG. 11 is an explanatory diagram illustrating an example of a GUI for reading mode settings that may be displayed on the screen of the multi-function peripheral.

FIG. 13 is an explanatory diagram illustrating an example of a message that prompts supplying of paper sheets.

DESCRIPTION OF THE EMBODIMENTS

Figure 1:
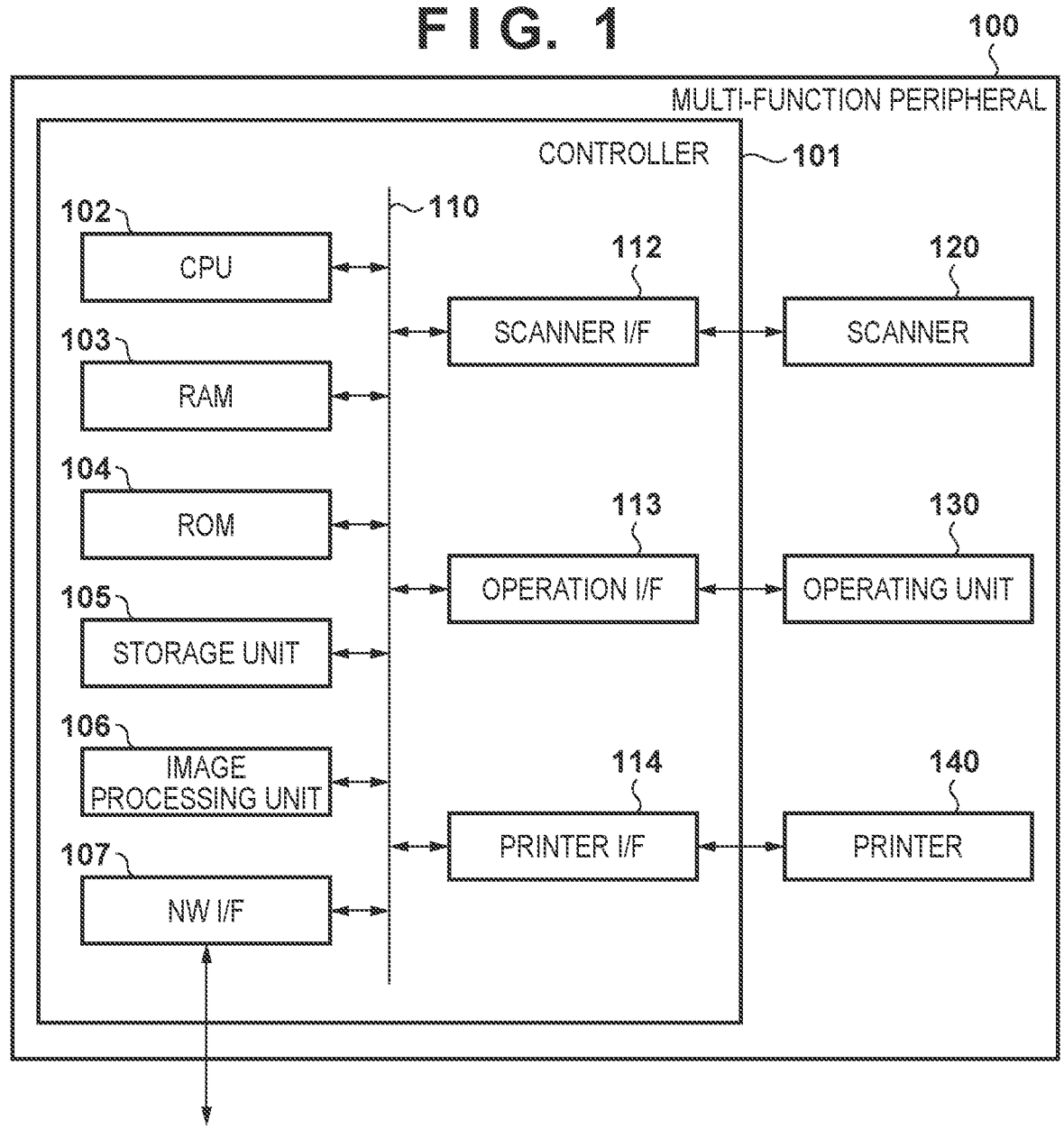
FIG. 1 is a block diagram illustrating an example of a configuration of a multi-function peripheral according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

1. Outline of Apparatus

In this section, an example is mainly described in which the technology according to the present disclosure is applied to a multi-function peripheral (MFP). However, the technology according to the present disclosure is generally broadly applicable to image processing apparatuses (for example, digital scanners and copying machines) and is not limited to multi-function peripherals. Also, unless otherwise noted, each of the constituent elements such as the apparatuses, devices, modules, and chips to be described below may be configured of a single entity or may be configured of a plurality of physically different entities.

FIG. 1 is a block diagram illustrating an example of a configuration of a multi-function peripheral 100 according to an embodiment. Referring to FIG. 1, the multi-function peripheral 100 includes a controller 101, a scanner 120, an operating unit 130, and a printer 140. The controller 101 includes a CPU 102, a RAM 103, a ROM 104, a storage unit 105, an image processing unit 106, a NW I/F 107, a bus 110, a scanner I/F 112, an operation I/F 113 and a printer I/F 114.

The central processing unit (CPU) 102 is a processor that controls the overall functions of the multi-function peripheral 100. The random access memory (RAM) 103 is a main storage device, and provides a temporary storage area for the CPU 102. The read-only memory (ROM) 104 is a non-volatile memory that stores a boot program for a system of the multi-function peripheral 100. The storage unit 105 is a secondary storage device such as a hard disk drive (HDD) or a solid state drive (SSD). The storage unit 105 stores programs (also referred to as software) for various functions of the multi-function peripheral 100, as well as various data such as image data, status data, and setting data. The programs stored in the storage unit 105 are loaded into the RAM 103 and are executed by the CPU 102. The image processing unit 106 is a processor dedicated to image processing, and performs various image processing, such as coding, decoding, and format converting, for the read image data generated by the scanner 120 and the image data for printing to be printed by the printer 140. The network interface (NW I/F) 107 is an interface for communication via a network (for example, a local area network (LAN)) between the multi-function peripheral 100 and other apparatuses. The bus 110 is a signal line that interconnects the CPU 102, the RAM 103, the ROM 104, the storage unit 105, the image processing unit 106, the NW I/F 107, the scanner I/F 112, the operation I/F 113, and the printer I/F 114. The scanner I/F 112 is an interface for connecting the controller 101 to the scanner 120. The operation I/F 113 is an interface for connecting the controller 101 to the operating unit 130. The printer I/F 114 is an interface for connecting the controller 101 to the printer 140.

The scanner 120 is a device that generates read image data of a document. The scanner 120 reads a document set on an ADF (illustrated in FIG. 2) or a document plate (not illustrated) to generate read image data, for example, when a read job is instructed via the operating unit 130 to be described below. The read image data, after being written to the RAM 103, is stored by the storage unit 105 or is sent to an external apparatus via the NW I/F 107, depending on a job type.

The operating unit 130 is a device that provides a user interface for operations of the multi-function peripheral 100. The operating unit 130 includes, for example, a display that displays images and information, and an input device (for example, one or more than one among a touch sensor, a button, a switch, and a keypad) that receives an operation by a user. The operating unit 130 causes a graphical user interface (GUI) image generated by the CPU 102 to be displayed on a screen of the display. Further, the operating unit 130 outputs an operation signal indicating the content of the operation received by the input device to the CPU 102.

The printer 140 is an image forming unit that forms an image on a paper sheet based on image data for printing. The printer 140 prints an image onto a paper sheet according to settings indicated by a print job, for example, when the print job is received from an external apparatus is the NW I/F 107. In addition, when a copy job is indicated via the operating unit 130, the printer 140 prints an image of a document on a paper sheet, based on read image data of the document generated by the scanner 120.

Figure 2:
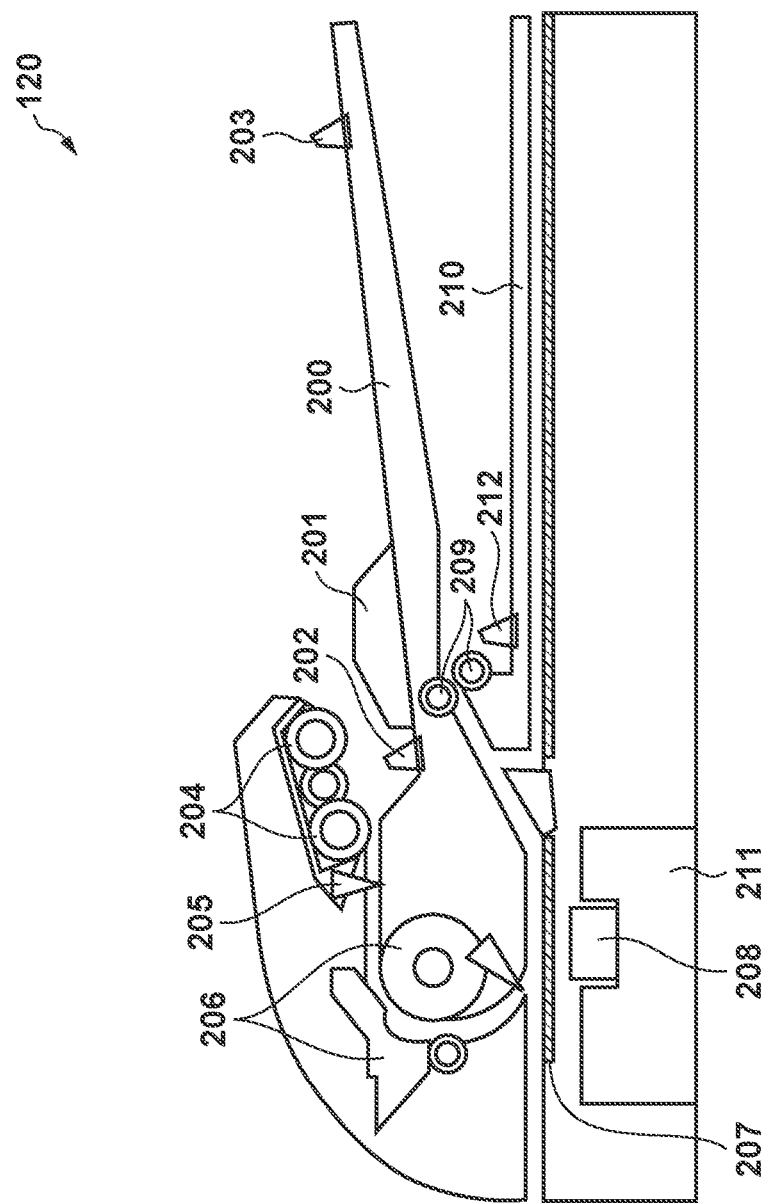
FIG. 2 is a schematic view illustrating an example of a physical structure of a scanner included in the multi-function peripheral illustrated in FIG. 1.

FIG. 2 is a schematic view illustrating an example of a physical structure of the scanner 120 included in the multi-function peripheral 100 illustrated in FIG. 1, particularly focusing on the ADF. In a case where a document is read by using the ADF, the document is placed on a document tray 200. The document tray 200 includes a pair of document guides 201, a placement sensor 202, and a size detection sensor 203. The document guides 201 are arranged at respective positions on the left and right sides of a document provided that a conveyance direction of the document is directed upward, and restricts movement of the document to be conveyed. The placement sensor 202 detects whether or not a document is placed on the document tray 200. The size detection sensor 203 simply detects a size of the document placed on the document tray 200. Pickup rollers 204 are provided at a front upper side (in the conveyance direction) of the document tray 200. The pickup rollers 204 feed the document placed on the document tray 200 one by one to a conveyance path. A passing sensor 205 and a conveyance roller 206 are provided midway on the conveyance path. The passing sensor 20 detects whether or not the document has passed and the timing when the document passes. The conveyance roller 206 conveys the document along the conveyance path. Paper sheet discharge rollers 209 are provided at an end of the conveyance path. The paper sheet discharge rollers 209 discharge the document that is conveyed along the conveyance path to a paper sheet discharge tray 210. The paper sheet discharge tray 210 has a paper sheet discharge sensor 212, and the paper sheet discharge sensor 212 detects that the document has been discharged to the paper sheet discharge tray 210. Although not illustrated in the figures, the pickup rollers 204, the conveyance roller 206, and the paper sheet discharge rollers 209 may be driven by a stepper motor, for example.

A reading window 207 through which light passes is provided on a bottom surface of the conveyance path, and a sensor unit 211 including an image sensor 208 is disposed below the reading window 207. The image sensor 208 may be, for example, a contact image sensor (CIS) or a charge coupled device (CCD). The reading window 207 has a constant width in a secondary scanning direction (a width direction of a document) perpendicular to the conveyance direction. The image sensor 208 is movable in a main scanning direction that is the same direction as the conveyance direction and the secondary scanning direction in the sensor unit 211. The image sensor 208 optically reads a document passing over the reading window 207, and then generates an image signal of a read image of the captured document through photoelectric conversion. The read image signal generated by the image sensor 208 is further processed by an image processing function of the scanner 120 to be described below.

Here, when the document is inclined during the reading of the document, a document portion becomes inclined in the read image. The reason why the document is inclined may be that a width between the document guides 201 is not appropriately fitted to the width of the document set in the ADF as illustrated in FIG. 2, or may be that unintended movement of the document occurs during document conveyance, or the like. In addition, the quality of document reading deteriorates not only by the inclination of the document but also by a positional displacement of the document.

FIG. 3A is a first explanatory diagram for describing an inclination and a positional displacement of a document. In FIG. 3A, a single sheet 11 is set on the document tray 200 that is the ADF. The sheet 11 has a width $W_1$ and a height $H_1$. In the bottom row of FIG. 3A, three types of positional relationships between the set sheet 11 and first and second document guides 201a and 201b are illustrated with the document tray 200 viewed from above. Each of the dashed-dotted lines in the figure is a line that extends along the center of the conveyance path in the conveyance direction. In the left example, a width $G_1$ between the two document guides 201a and 201b matches the width $W_1$ of the sheet 11. In this case, it is less likely that an inclination and a positional displacement of a document portion occur in read image data (but the possibility is not zero). In the middle and right examples, a width $G_2$ between the two document guides 201a and 201b is larger than the width $W_1$ of the sheet 11. In these cases, it is highly likely that an inclination and a positional displacement of a document portion occur in read image data. In the middle example, a position of the sheet 11 is displaced by $d_1$ with respect to the center line. In the right example, the sheet 11 is inclined with respect to the center line by an angle $r_1$.

Figure 3B:
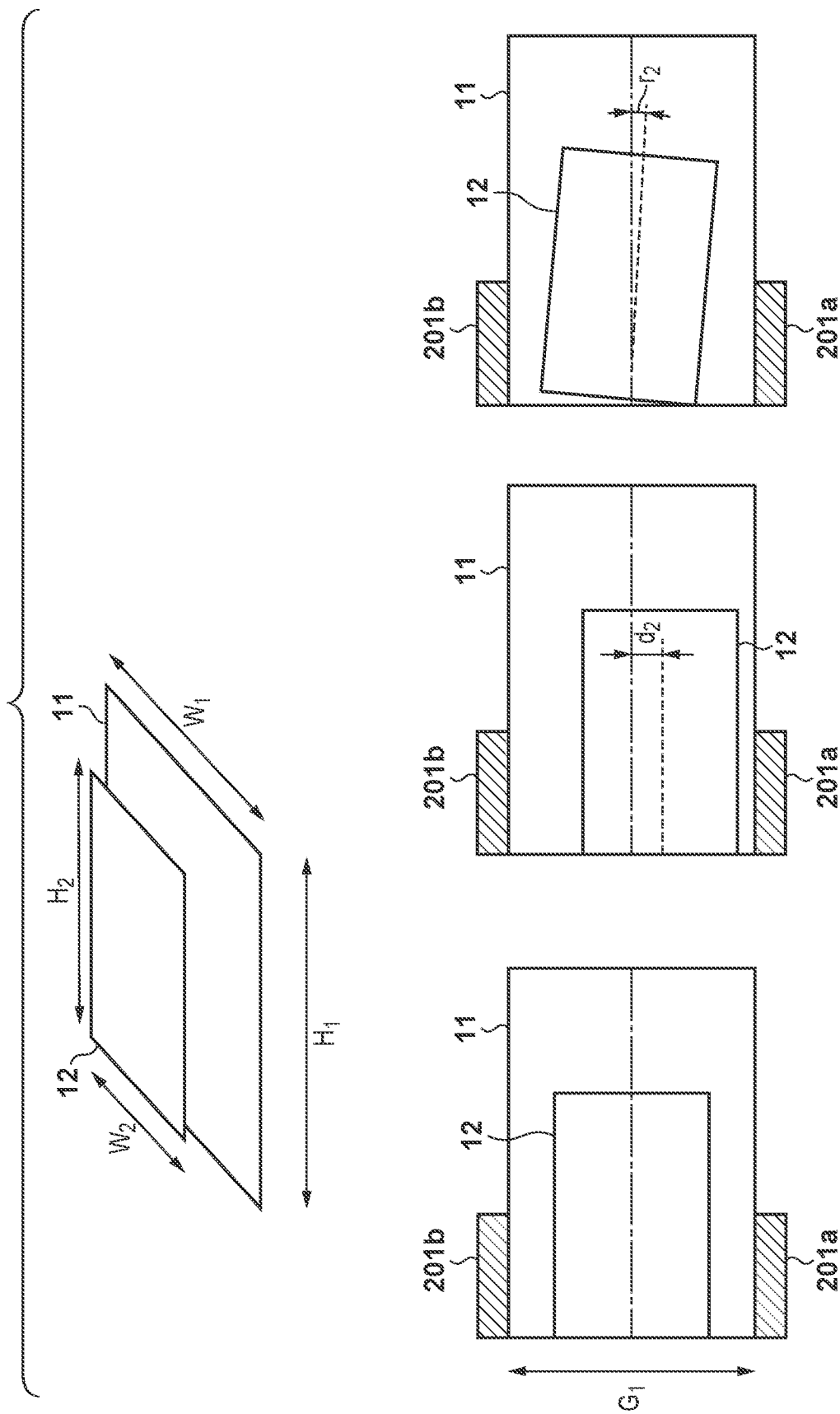
FIG. 3B is a second explanatory diagram for describing an inclination and a positional displacement of a document.

FIG. 3B is a second explanatory diagram for describing an inclination and a positional displacement of a document. In FIG. 3B, two sheets 11 and 12 having different sizes are set on the document tray 200 that is the ADF. The sheet 12 has a width $W_2$ and a height $H_2$. In the bottom row of FIG. 3B, three types of positional relationships between the set sheets 11 and 12 and the first and second document guides 201a and 201b are illustrated with the document tray 200 viewed from above. In all of the three types of examples, the width $G_1$ between the two document guides 201a and 201b matches the width $W_1$ of the larger sheet 11. In such a case where a plurality of sheets having different sizes are to be read at once as a document, the width between the document guides needs to be adjusted to the width of the largest sheet, making it difficult to restrict movement of a smaller sheet in the left example, the sheet 12 is appropriately set along the center line, but the sheet 12 may be inclined or may be displaced from the center line during conveyance. In the middle example, a position of the sheet 12 is displaced by $d_2$ with respect to the center line. In the right example, the sheet 12 is inclined with respect to the center line by an angle $r_2$.

In a case where the width between the document guides is too wide compared to the width of the document as in the examples illustrated in FIGS. 3A and 3B, when reading by the image sensor 208 is performed in a fitted manner with a regular document size, a portion of the document may fall out of a reading range or a blank portion may enter the reading range. A portion that has gone out of the reading range will be missed in read image data. Reading the blank portion causes an unwanted blank space in the read image data. Existing approaches to correcting an inclination after reading a document with a regular document size cannot sufficiently resolve such a deterioration in reading quality. In light of the foregoing, the multi-function peripheral 100 according to the present embodiment mitigates the deterioration in reading quality due to an inclination and a positional displacement of a document as much as possible in a manner to be described in the following sections.

2. Functional Configuration 2-1. Overall Configuration

Figure 4:
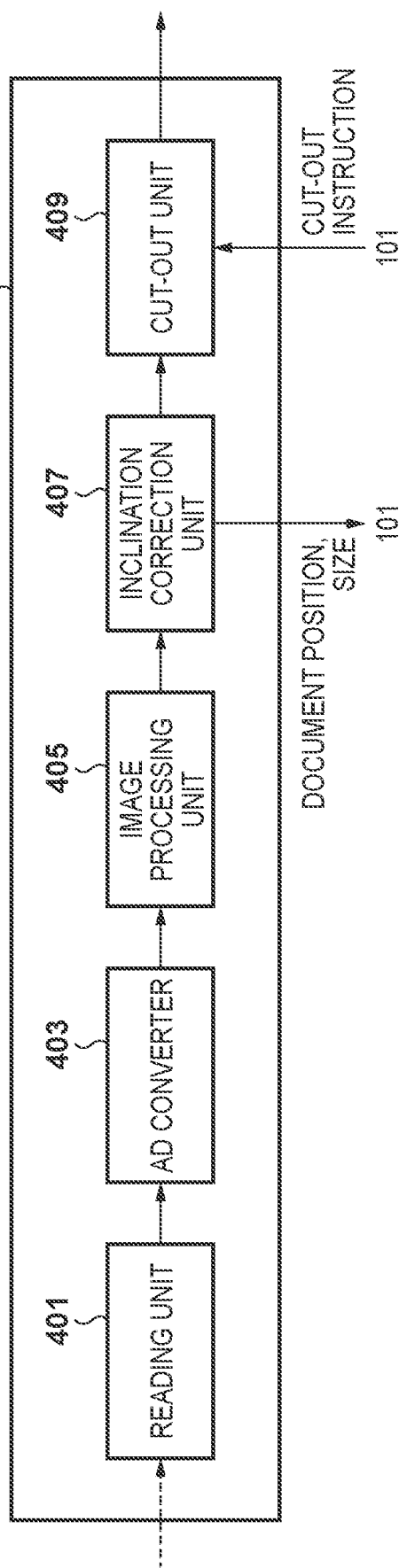
FIG. 4 is a block diagram illustrating an example of a functional configuration of the scanner according to the embodiment.

FIG. 4 is a block diagram illustrating an example of a functional configuration of the scanner 120 according to the present embodiment. Referring to FIG. 4, the scanner 120 includes a reading unit 401, an AD converter 403, an image processing unit 405, an inclination correction unit 407, and a cut-out unit 409.

The reading unit 401 is a functional unit implemented by using the image sensor 208 illustrated in FIG. 2, and reads a document to generate an analog form of a read image signal. The reading unit 401 outputs the generated read image signal to the AD converter 403. The analog to digital (AD) converter 403 converts the analog form of the read image signal into a digital form of the read image data. The AD converter 403 outputs the read image data to the image processing unit 405. The image processing unit 405 applies image processing such as shading correction, modulation transfer function (MTF) correction, and high frequency suppression to the read image data. The image processing unit 405 outputs the read image data after the application of the image processing to the inclination correction unit 407. The inclination correction unit 407 corrects an inclination of a document portion in the read image data by performing an image rotation process. Additionally, the inclination correction unit 407 determines a position and a size of the document portion in the read image data and outputs the determination result to the controller 101. An example of a more detailed configuration of the inclination correction unit 407 will be described later. The inclination correction unit 407 outputs the read image data after the inclination correction to the cut-out unit 409. In a case where the cut-out unit 409 is instructed from the controller 101 to cut out a partial image of the document portion (a document portion image), the cut-out unit 409 cuts out, according to the position and the size of the document portion determined by the inclination correction unit 407, the document portion image from the read image data in which the inclination has been collected. Then, the cut-out unit 409 outputs, to the controller 101, partial image data representing the document portion image that has been cut out.

2-2. Details of Inclination Correction Unit

Figure 5:
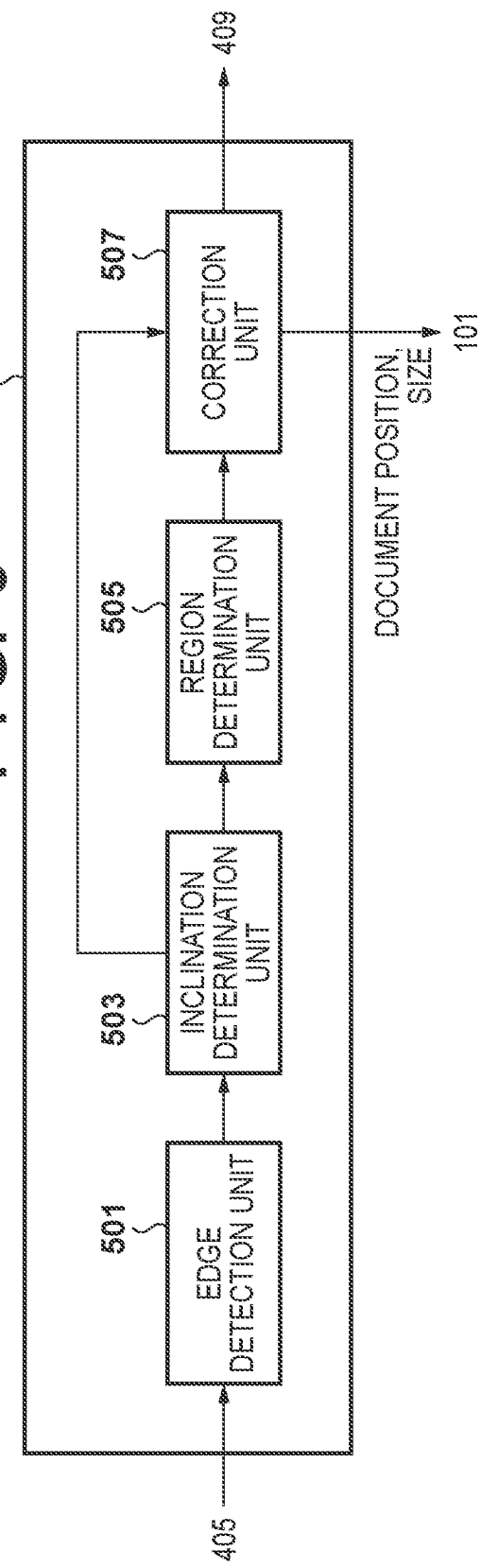
FIG. 5 is a block diagram illustrating an example of a detailed configuration of an inclination correction unit illustrated in FIG. 4.

FIG. 5 is a block diagram illustrating an example of a detailed configuration of the inclination correction unit 407 illustrated in FIG. 4. Referring to FIG. 5, the inclination correction unit 407 includes an edge detection unit 501, an inclination determination unit 503, a region determination unit 505, and a correction unit 507.

The edge detection unit 501 detects edges of the document portion in the read image data input from the image processing unit 405. The edge detection unit 501 may detect edges in the read image data by using any known edge detection technique such as a Prewitt filter or a Sobel filter, for example. The edge detection unit 501 outputs the edge detection result to the inclination determination unit 503. The inclination determination unit 503 determines an inclination of the document portion in the read image data based on an inclination of the edges detected by the edge detection unit 501. The inclination determination unit 503 recognizes a contour of the document portion by, for example, applying a Hough transformation to the edge detection result input from the edge detection unit 501. Then, the inclination determination unit 503 determines an angle formed by the recognized contour of the document portion with respect to a vertical axis or a horizontal axis in the read image data as an inclination of the document portion in the read image data. The inclination determination unit 503 outputs the determined inclination of the document portion to the correction unit 507. Also, the inclination determination unit 503 outputs the recognition result of the contour of the document portion to the region determination unit 505. The region determination unit 505 determines the position (for example, an offset from an origin of the read image) and the size of the document portion in the read image data from the contour of the document portion recognized based on the edge detection result. Then, the region determination unit 505 outputs region information including the determined position and size of the document portion together with the read image data to the correction unit 507. The correction unit 507 corrects the inclination of the document portion determined by the inclination determination unit 503 by performing a rotation process on the read image data. In a case where, for example, the inclination of the document portion is determined to be equal to r, the correction unit 507 performs the rotation process so as to rotate the entire reading image by a rotation angle–r. The correction unit 507 derives a position in the read image data after the rotation corresponding to the position of the document portion determined by the region determination unit 505. The derived position after the rotation is a reference position for cut-out of the document portion in the read image data after the rotation. Then, the correction unit 507 outputs the read image data after the rotation to the cut-out unit 409. In addition, the correction unit 507 outputs region information including the position and the size of the document portion after the rotation to the controller 101.

As described above, the controller 101 (for example, the CPU 102) is a device that controls generation of read images by the scanner 120. The controller 101 selects an image cut-out size from a plurality of candidate sizes according to, for example, the size of the document portion determined by the inclination correction unit 407. The candidate sizes here may be, for example, any combination of: either one of A3, A4, B4, B5, and a letter size; and a portrait orientation or a landscape orientation. The image cut-out size may be, for example, the smallest size among the candidate sizes that are larger than the size of the document portion determined by the region determination unit 505. Alternatively, the controller 101 may select the size of the document portion determined by the region determination unit 505 as the image cut-out size. When the selected image cut-out size is different from the original read image size, the controller 101 outputs a cut-out instruction indicating the reference position of the cut-out and the selected image cut-out size to the cut-out unit 409. The cut-out unit 409 cuts out the document portion image from the read image data after the inclination correction in accordance with such a cut-out instruction from the controller 101.

Figure 6:
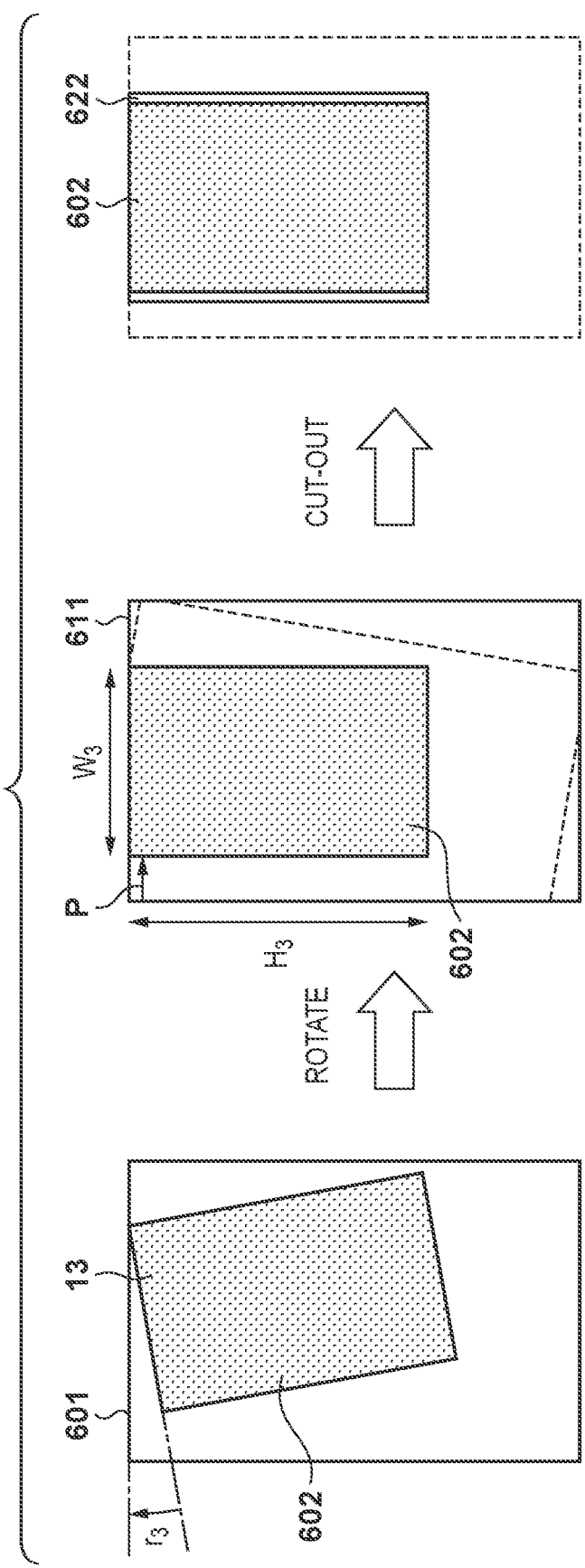
FIG. 6 is an explanatory diagram for describing cut-out of a document portion image from a read image.

FIG. 6 is an explanatory diagram for describing the above-described cut-out of the document portion image from the read image. A read image 601 illustrated in left-hand side of FIG. 6 is an image generated by reading a sheet 13 in a reading range equivalent to A3 portrait. However, the sheet 13 is smaller than the reading range described above, and a document portion 602 in which the sheet 13 is actually captured within the read image 601 is inclined by an angle $r_3$ in an anticlockwise direction. Thus, as illustrated in the middle of FIG. 6, the correction unit 507 rotates the image by the angle $r_3$ in a clockwise direction, and generates a read image 611 after rotation. In the read image 611 after the rotation, the document portion 602 has the size of a width $W_3$ and a height $H_3$ (the size of the document portion is not changed by the rotation). A position of the document portion 602 is represented by positional coordinates P with respect to the upper left corner of the read image serving as an origin, for example. The cut-out unit 409 cuts out, from the read image 611 after the rotation, a document portion image 622 including the document portion having the width $W_3$ and the height $H_3$ with the starting point at positional coordinates P in an image cut-out size instructed by the controller 101.

In one example, the scanner 120 includes the inclination correction unit 407 and the cut-out unit 409 as described above. In this case, the scanner 120 may output only partial image data of the document portion cut out by the cut-out unit 409 to the controller 101, for example, by writing the partial image data in the RAM 103. According to such an example, an amount of memory required to deliver read image data (after cut-out) from the scanner 120 to the controller 101 can be saved.

In another example, the scanner 120 includes the inclination correction unit 407, and the controller 101 includes the cut-out unit 409. In this case, the inclination correction unit 407 writes the read image data in which the inclination is corrected in the RAM 103. The cut-out unit 409 included in the controller 101 cuts out a partial image of the document portion by reading out data corresponding to the document portion of the read image data written in the RAM 103. According to such an example, it is possible to achieve the cut-out of a document portion image in a simple manner of partial reading from a memory. In this example, the scanner 120 may offset the document portion in the read image data according to a predetermined condition and then write data in the RAM 103. The predetermined condition may be, for example, centering or left upward alignment. According to this technique, the cut-out of the document portion image by the cut-out unit 409 can be achieved by a simple process of reading data in a range corresponding to an image cut-out size from a fixed memory position of the RAM 103.

Note that the present embodiment is not limited to the examples described above. For example, both the inclination correction unit 407 and the cut-out unit 409 may be included in the controller 101. In this case, the scanner 120 may pass the read image data before the inclination correction to the controller 101 via the RAM 103.

3. Flow of Processing

Figure 7:
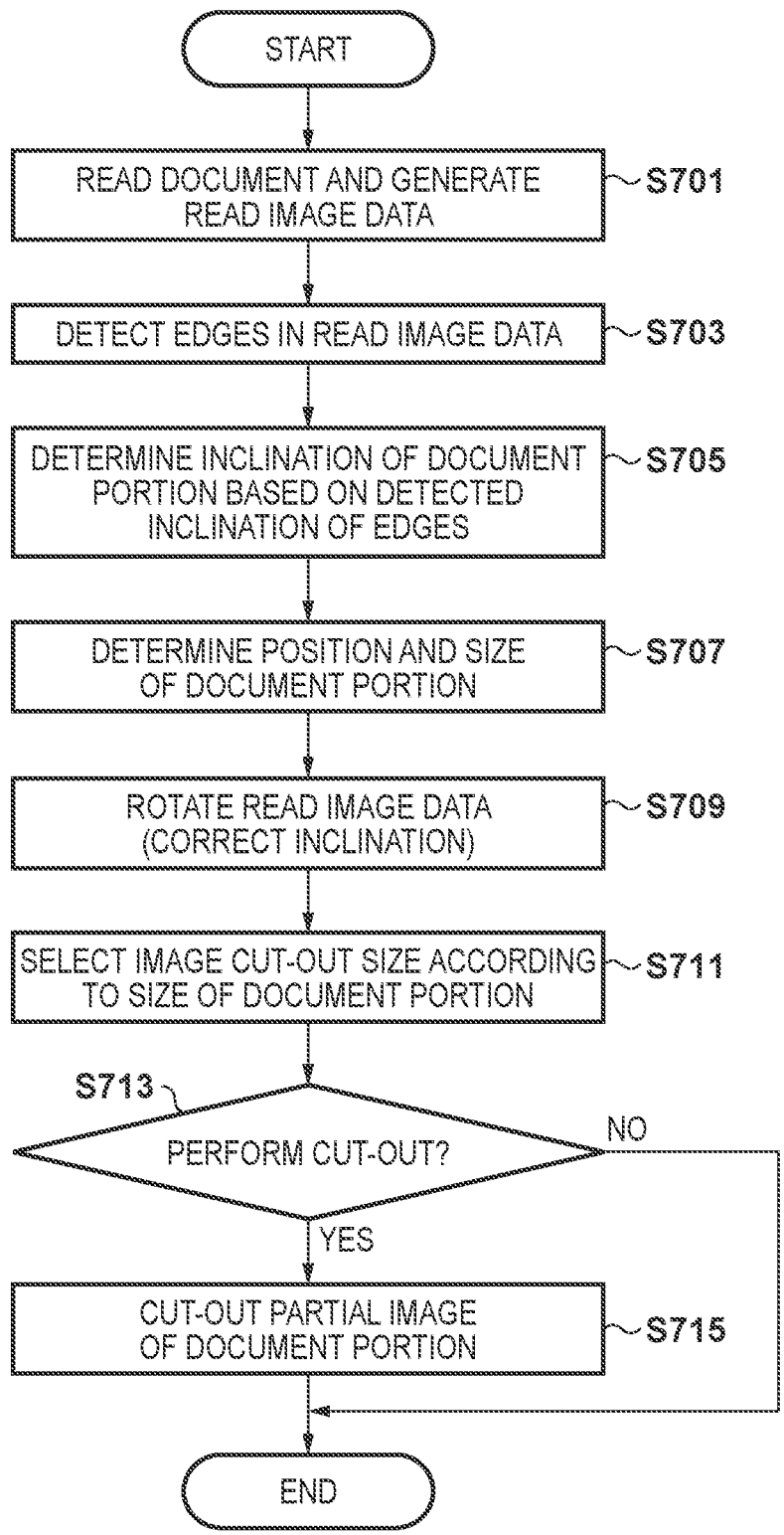
FIG. 7 is a flowchart illustrating an example flow of a document cut-out process according to the embodiment.

FIG. 7 is a flowchart illustrating an example flow of a document cut-out process according to the present embodiment. The process illustrated in FIG. 7 may be performed by the scanner 120 and the controller 101 under control by the CPU 102 executing a computer program loaded into the RAM 103. Note that in the following descriptions, a processing step is abbreviated as S (step).

First, in S701, the scanner 120 reads a document by using the reading unit 401, and generates read image data from a read image signal by using the AD converter 403 and the image processing unit 405. Next, in S703, the edge detection unit 501 included in the inclination correction unit 407 detects edges of a document portion in the read image data input from the image processing unit 405. Next, in S705, the inclination determination unit 503 determines an inclination of the document portion in the read image data based on an inclination of the edges detected by the edge detection unit 501. Next, in S707, the region determination unit 505 determines a position and a size of the document portion in the read image data based on the edge detection result. Next, in S709, the correction unit 507 corrects the inclination of the document portion determined by the inclination determination unit 503 by performing a rotation process on the read image data. Next, in S711, an image cut-out size is selected, for example, by the controller 101 according to the size of the document portion determined by the region determination unit 505. Next, in S713, the controller 101 determines whether or not to cut out a document portion image. For example, the control 101 may determine to cut out the document portion image when the image cut-out size selected in S711 is smaller than the original read image size. Herein, it may be contemplated that the controller 101 determines that the document portion image is to be cut out only when a reading mode for cutting out the document portion image is set by a user, as in a mixed-size mode to be described later. In a case where it is determined that the document portion image is to be cut out, the cut-out unit 409 cuts out the document portion image from the read image data whose inclination has been corrected by using the position and the size that have been instructed by the controller 101.

4. Application Example 4-1. Various Operation Modes

Figure 8:
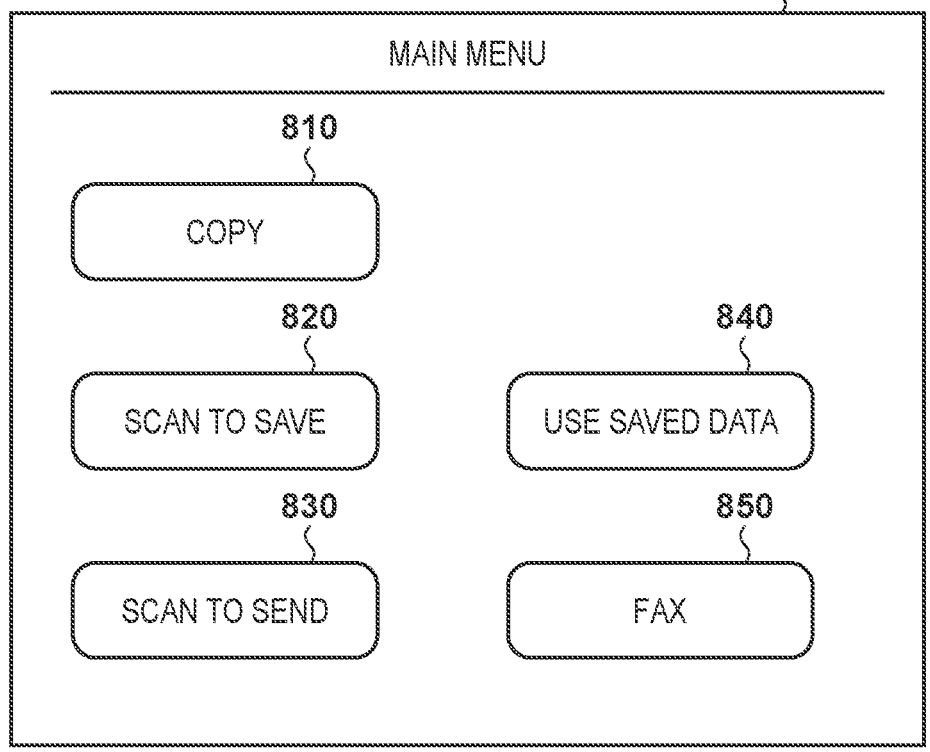
FIG. 8 is an explanatory diagram illustrating an example of a main menu that may be displayed on a screen of the multi-function peripheral.

The multi-function peripheral 100 can operate in various operation modes, and in some of these operation modes, the above-described cut-out of the document portion image is performed. As an application example, FIG. 8 illustrates an example of a main menu that may be displayed on a screen of the operating unit 130 included in the multi-function peripheral 100 where a user can select one of a plurality of operation modes. A main menu 800 illustrated in FIG. 8 has five buttons 810, 820, 830, 840, and 850. The button 810 is a button for selecting a first operation mode for copying. When the first operation mode is selected, the printer 140 forms an image of a document on a paper sheet (that is, a document is copied) based on read image data generated by the scanner 120. The button 820 is a button for selecting a second operation mode for scanning and saving (also referred to as box scan). When the second operation mode is selected, read image data generated by the scanner 120 is saved in the storage unit 105. The button 830 is a button for selecting a third operation mode for scanning and sending. When the third operation mode is selected, read image data generated by the scanner 120 is sent to a designated destination via the NW I/F 107. The button 840 is a button for selecting a fourth operation mode for sending or printing the saved data. When the fourth operation mode is selected, the saved read image data, for example, in the storage unit 105, is sent to a designated destination, or is printed. The button 850 is a button for selecting a fifth operation mode for facsimile transmission. When the fifth operation mode is selected, read image data generated by the scanner 120 is transmitted to a designated facsimile terminal through a facsimile line. In these operation modes other than the fourth operation mode, the above-described cut-out of the document portion image may be performed during reading of the document.

Figure 9:
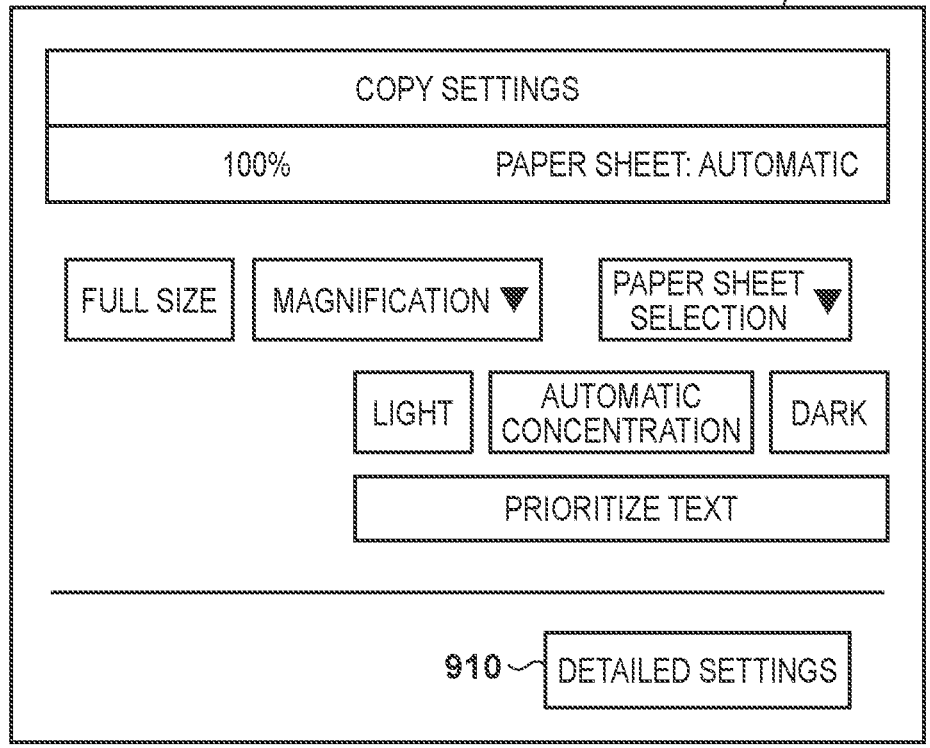
FIG. 9 is an explanatory diagram illustrating an example of a GUI for function settings that may be displayed on the screen of the multi-function peripheral.

FIG. 9 is an explanatory diagram illustrating an example of a GUI for a function settings that may be displayed on the screen of the multi-function peripheral 100. Here, a setting window 900 that may be displayed when the button 810 of the main menu 800 illustrated in FIG. 8 is operated is illustrated by way of example. The setting window 900 includes a detail setting button 910 in addition to operation objects for designating basic setting values, such as magnification rate, paper sheet, and concentration of copying. When the detail setting button 910 is operated, a detail setting window 1000 as illustrated in FIG. 10 may be displayed on the screen. The detail setting window 1000 has a plurality of setting buttons including a setting button 1010, and a close button 1020. In the example of FIG. 10, a color of the setting button 1010 is reversed, meaning that a reading mode has been selected to enable cut-out of a document portion image. When the setting button 1010 is operated, a mode setting window 1100 as illustrated in FIG. 11 may be displayed on the screen. The mode setting window 1100 has two mode setting buttons 1110 and 1120. The mode setting button 1110 is associated with an equal-width mode that is one of a plurality of reading modes. The mode setting button 1120 is associated with a different-width mode that is the other one of the plurality of reading modes.

Figure 12A:
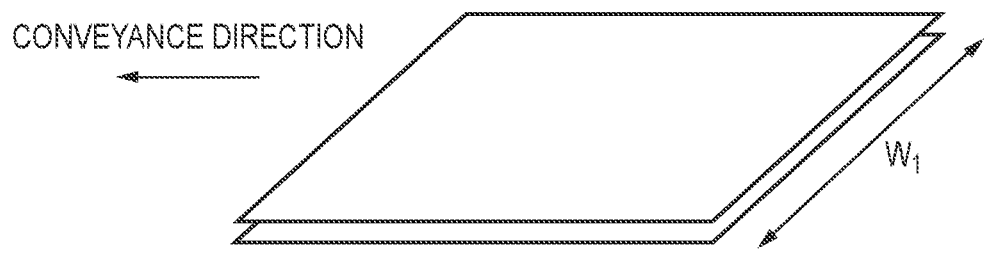
FIG. 12A is an explanatory diagram for describing a certain type of reading mode.
Figure 12B:
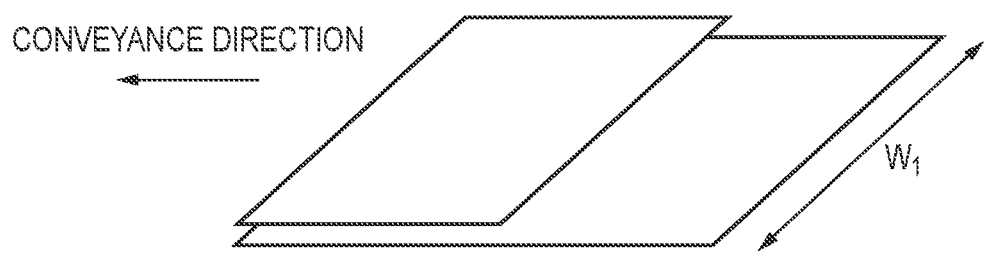
FIG. 12B is an explanatory diagram for describing another type of reading mode.
Figure 12C:
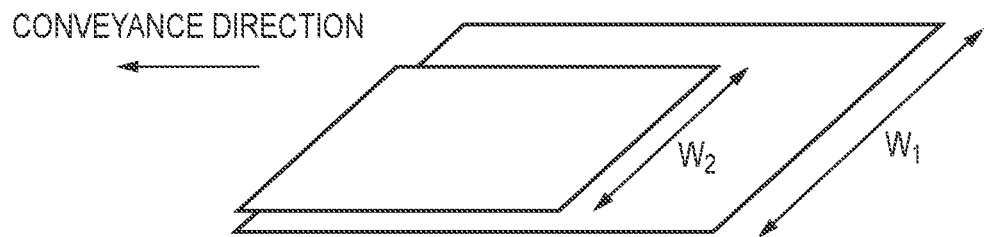
FIG. 12C is an explanatory diagram for describing yet another type of reading mode.

As an example, the scanner 120 of the multi-function peripheral 100 support three types of reading modes that are an equal-size mode, the equal-width mode, and the different-width mode. FIGS. 12A to 12C illustrate states of documents placed on the document tray 200 of the scanner 120 in the respective three types of reading modes. In the case of FIG. 12A, the document on the document tray 200 consists of a plurality of sheets having the same size. The width $W_1$ is common to all sheets, and a user fits a guide width with the width $W_1$ to start reading the document, which can prevent an inclination and a positional displacement of the document to some extent. In this case, the user may select the equal-size mode. When the equal-size mode is selected, the controller 101 may disable cut-out of a document portion image. When the cut-out of the document portion image is disabled, regardless of the content of read image data, the cut-out unit 409 does not cut out the document portion image. This can avoid a risk that read images of some of the sheets become smaller against the intention of the user.

In the case of FIG. 12B, the document on the document tray 200 includes a plurality of sheets having an equal-width and different heights (lengths in the conveyance direction). The width $W_1$ is common to all sheets, and the user fits the guide width with the width $W_1$ to start reading the document, which can prevent an inclination of the document to some extent. In this case, the user may select the equal-width mode. The controller 101 may enable cut-out of a document portion image when the equal-width mode is selected. When the cut-out of the document portion image is enabled, the cut-out unit 409, as described above, cuts out a document portion image from read image data according to a size of the document portion determined from the read image data. In the equal-size mode and the equal-width mode, inclination correction may be disabled.

In the case of FIG. 12C, the document on the document tray 200 includes a plurality of sheets having at least different widths. For example, a width of a sheet is equal to $W_1$ and a width of another sheet is equal to $W_2$ smaller than $W_1$. When the user fits the guide width with the width $W_1$ to start reading the document, it is likely that an inclination or a positional displacement of the sheet having the width $W_2$ occurs. In this case, the user may select the different-width mode. The controller 101 may enable both correction of the inclination and cut-out of a document portion image when the different-width mode is selected. Thereby, it is possible to provide the user with a set of read images that have no missing part with a size of each sheet in the document being matched, even after one or both of inclination and positional displacement of a sheet occurred.

Returning to FIG. 11, when the mode setting button 1110 is operated by the user, the controller 101 selects the equal-width mode (or releases the selection of the equal-width mode). When the mode setting button 1120 is operated, the controller 101 selects the different-width mode (or releases the selection of the different-width mode). The equal-width mode and the different-width mode are alternative options (when one of them is selected, the other selection is released). When both of the selections of the equal-width mode and the different-width mode are released, the controller 101 may select the equal-size mode. Note that the mode setting window 1100 may have a separate button associated with the equal-sin mode. In the following description, the equal-width mode and the different-width mode are also comprehensively referred to as a 'mixed-size mode'. When the mixed-size mode is selected, the color of the setting button 1010 is reversed in the detail setting window 1000, as in the example illustrated in FIG. 10.

When the mixed-size mode is selected for a copy operation, the controller 101 instructs the printer 140 to print the document portion image cut out by the cut-out unit 409. The printer 140 forms the document portion image on a paper sheet having a paper sheet size fitted with the size of the document portion image in accordance with the printing instruction from the controller 101. When a paper sheet having the paper sheet size fitted with the size of the document portion image is not available in cassettes (paper feed trays) of the printer 140, the controller 101 may cause a message for prompting supply of paper sheets to be displayed on the screen of the operating unit 130. FIG. 13 illustrates an example of such a message. A message window 1300 illustrated in FIG. 13 includes a message that there is no A4 landscape paper sheet which fits with the document portion image, as well as indications of sizes and types of paper sheets currently contained in individual cassette per cassette basis. The user who checks such a message may supply paper sheets having the designated size (for example, A4 landscape) to an appropriate cassette, and printing of the document portion image will then be started.

4-2. Flow of Processing

Figure 14:
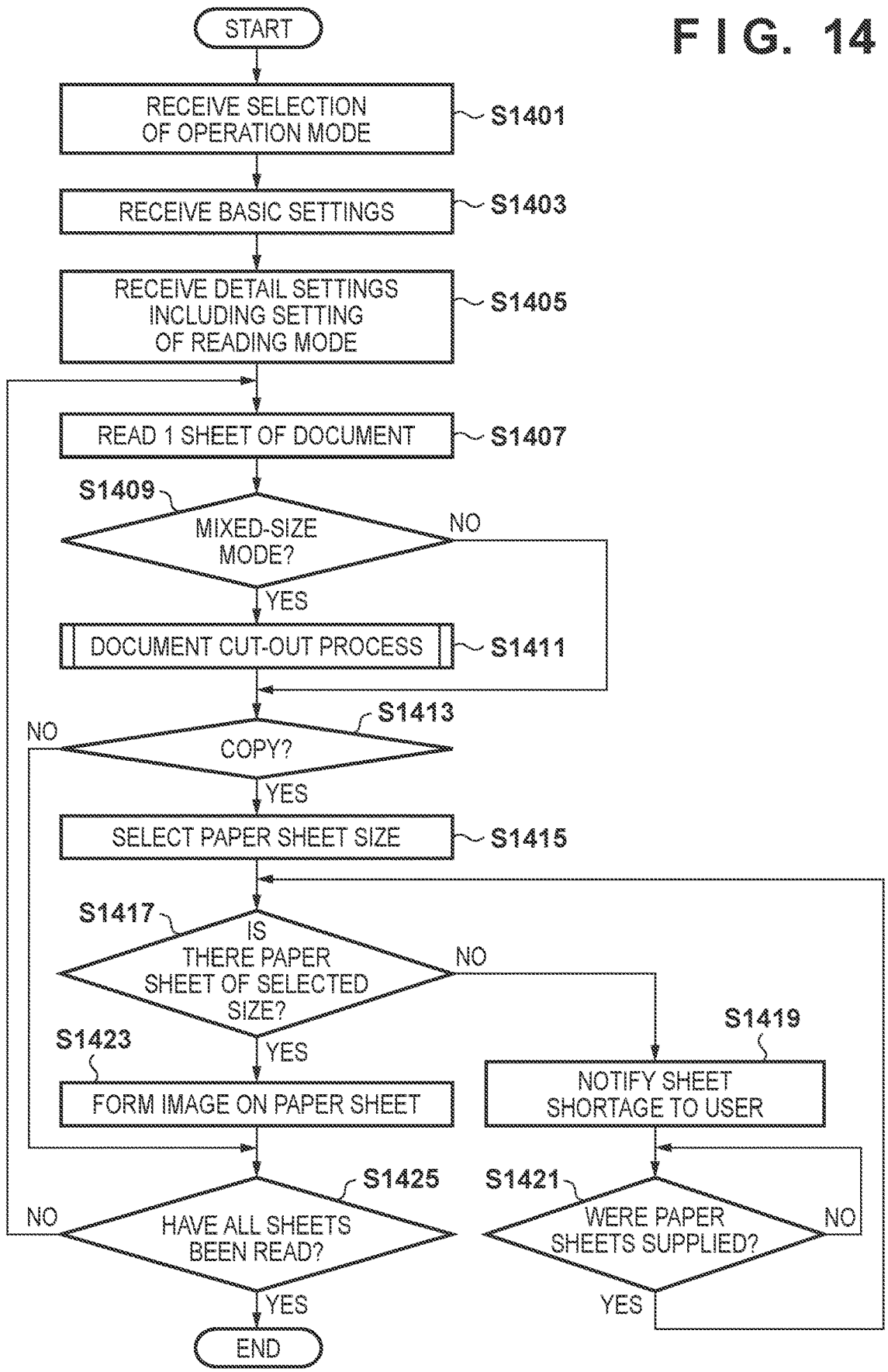
FIG. 14 is a flowchart illustrating an example flow of processing according to an application example.

FIG. 14 is a flowchart illustrating an example flow of processing according to an application example of the present embodiment. The processing illustrated in FIG. 14 may be performed by the scanner 120 and the controller 101 under control by the CPU 102 executing a computer program loaded into the RAM 103.

First, in S1401, the controller 101 receives a selection of an operation mode by a user (for example, copy, box scan, or the like) through the main menu 800 as illustrated in FIG. 8. Here, it is assumed that an operation mode involving reading of a document is selected. Then, in S1403, the controller 101 receives basic settings for the operation mode selected in S1401 through the setting window 900 as illustrated in FIG. 9. Then, in S1405, the controller 101 receives detail settings including a setting of the reading mode through the detail setting window 1000 as illustrated in FIG. 10. For example, the equal-size mode or the mixed-size mode corresponding to either of the equal-width mode or the different-width mode described with reference to FIGS. 12A to 12C is selected here as the reading mode. The controller 101 then starts operation in the selected reading mode and causes the scanner 120 to read a document in S1407. The scanner 120 reads one sheet of the document and generates read image data. The controller 101 also determines, in S1409, whether the mixed-size mode is selected as the reading mode, and performs a document cut-out process in S1411 when the mixed-size mode is selected. The flow of the document cut-out process is as described above with reference to FIG. 7 (however, S701 duplicating with S1407 is omitted).

The subsequent process branches in S1413 depending on whether a copy mode is selected as the operation mode. When the copy mode is selected, the processing proceeds to S1415. When an operation mode other than the copy mode is selected, the processing proceeds to S1425. When the copy mode is selected, in S1415, the controller 101 selects a paper sheet size for printing that matches a size of an image to be printed for example, a document portion image). The controller 101 then determines whether or not the paper sheet having the selected size is available in any of the cassettes. When the paper sheet having the selected size is not available in any of the cassettes, the controller 101 notifies the user of paper sheet shortage by causing a message window 1300 to be displayed, as illustrated in FIG. 13, on the screen in S1419. In this case, the controller 101 waits for the supply of the paper sheets by the user in S1421. Once the appropriate paper sheets are supplied by the user, the processing returns to S1417. When the appropriate paper sheet is available in any of the cassettes, in S1423, the controller 101 instructs the printer 140 to print the image of the sheet. The printer 140 forms the image on a paper sheet having the selected paper size in accordance with the instruction from the controller 101. In the mixed-size mode, the image formed here may be a document portion image. The controller 101 then determines, in S1425, whether or not the reading for all sheets of the document has ended. In a case where a sheet that has not yet been read remains, the processing returns to S1407, and S1407 to S1425 are repeated for the next sheet. In a case where the reading for all sheets has ended, the processing in FIG. 14 ends.

Note that, although not illustrated in FIG. 14, when an operation mode such as scanning and saving, scanning and sending or facsimile transmitting is selected as described in connection with FIG. 8, processing such as data sending, or data saving corresponding to each operation mode may be additionally performed.

5. Summary

Embodiments of the present disclosure have been described in detail by using FIG. 1 to FIG. 14. In the embodiments described above, an inclination of a document portion in read image data generated by reading a document is determined, and after the determined inclination is corrected by image rotation, a document portion image is cut out from the corrected read image data. According to such a configuration, image data of the document portion image can be appropriately acquired without any portion missing in the document portion and an unwanted blank space generated due to an inclination or a positional displacement of the document.

Also, in the embodiments described above, the inclination of the document portion may be determined based on an inclination of an edge of the document portion detected in the read image data. According to such a configuration, the inclination of the document portion can be determined by digital processing without providing a sensor for detecting an inclination of a document in the scanner.

In the embodiments described above, a size of the document portion is determined from the edge of the document portion detected in the read image data, and the document portion image may be cut out according to the determined size. According to such a configuration, after reading the document so as to contain the entire document without narrowing the reading range of the document to the document size in advance, the document portion image can be cut out from the read image so that no document portion will be missing.

Also, in the embodiments described above, the document portion image may be cut out in a size selected according to the size of the document portion among a plurality of candidate sizes. According to such a configuration, the document portion image of the appropriate size can be acquired while preventing the cut-out size from varying depending on document portion recognition in the read image data.

Also, in the embodiments described above, the document portion image may be cut out from the read image data after the inclination correction at a cut-out position derived based on the detected position of the edge. According to such a configuration, even when the position of the document portion changes due to the inclination correction, the document portion image can be cut out at the appropriate position.

Also, in the embodiments described above, the document portion image may be cut out from the read image data when a first reading mode (for example, the equal-width mode or the different-width mode) that corresponds to reading a plurality of sheets having different sizes is selected among a plurality of reading modes. According to such a configuration, it is possible to flexibly switch, depending on a type of document or a need of a user, whether or not to cut out a document portion image.

Also, in the embodiments described above, the document portion image cut out from the read image data may be formed by a printer on a paper sheet having a paper sheet size that matches a size of the portion image. With such a configuration, it is possible to copy the document to the paper sheet having the size equivalent to that of the document while mitigating, as much as possible, deterioration in reading quality due to an inclination and a positional displacement of the document.

6. Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of priority from Japanese Patent Application No. 2019-231989, filed on Dec. 23, 2019 which is hereby incorporated by reference herein in its entirety.

What is claimed is:

1. An image processing apparatus comprising:
   a reader configured to read a document sheet with a reading size to generate an image; and
   one or more processors and/or one or more circuits configured to perform a plurality of processes, including:
   detecting a size of the document sheet based on the image generated by the reader;
   determining whether the detected size of the document sheet is smaller than the reading size; and
   in a case where it is determined that the detected size of the document sheet is smaller than the reading size, performing a cut-out process to cut out a document image of the document sheet from the image generated by the reader,
   wherein, in a case where it is determined that the detected size of the document sheet is not smaller than the reading size, the cut-out process is not performed.

2. The image processing apparatus according to claim 1, wherein the plurality of processes further include:
   detecting a position of the document sheet in the image generated by the reader,
   wherein the cut-out process is performed based on the detected size and position of the document sheet.

3. The image processing apparatus according to claim 1, wherein the plurality of processes further include:
   detecting edges of the document sheet in the image generated by the reader, wherein the size of the document sheet is detected based on the detected edges.

4. The image processing apparatus according to claim 1, further comprising:
   a scanner that includes the reader and is configured to perform the cut-out process, and
   a controller configured to cause the scanner to perform the cut-out process in a case where it is determined that the detected size of the document sheet is smaller than the reading size.

5. The image processing apparatus according to claim 4, wherein the scanner is configured to output only the document image cut out by the scanner to the controller.

6. The image processing apparatus according to claim 1, wherein the plurality of processes further include:
   correcting an inclination of the document image in the image generated by the reader.

7. The image processing apparatus according to claim 1, further comprising:
   a printer configured to perform printing based on the document image on a print sheet having a sheet size fitting with a size of the document image.

8. An image processing method to be executed in an image processing apparatus including a reader configured to read a document sheet with a reading size to generate an image, the image processing method comprising:
   detecting a size of the document sheet based on the image generated by the reader;
   determining whether the detected size of the document sheet is smaller than the reading size; and
   in a case where it is determined that the detected size of the document sheet is smaller than the reading size, performing a cut-out process to cut out a document image of the document sheet from the image generated by the reader,
   wherein, in a case where it is determined that the detected size of the document sheet is not smaller than the reading size, the cut-out process is not performed.

* * * * *